United States Patent Office 3,134,777
Patented May 26, 1964

3,134,777
DERIVATIVES OF DODECAHYDRO-1,4,7,9b-TETRAAZAPHENALENE
James D. McClure, San Francisco, Calif., assignor to Shell Oil Company, New York, N.Y., a corporation of Delaware
No Drawing. Filed Mar. 27, 1963, Ser. No. 268,437
17 Claims. (Cl. 260—256.4)

This invention relates to a novel class of hetrocyclic compounds. More particularly, it relates to N-substituted dodecahydro-1,4,7,9b-tetraazaphenalenes.

A wide variety of compounds containing epoxy, i.e., oxirane, groups has found utilization in the production of epoxy resins. These compounds include glycidyl esters and ethers prepared by reaction of epichlorohydrin and related materials with hydroxylic compounds, and various condensation products derived from glycidaldehyde.

It has been found that the degree of epoxy functionality, that is the number of epoxy linkages present within a single molecule, is a critical factor in determining both the properties of the resins produced when the epoxy compound is cured and the most suitable curing agents to produce the resins. For example, cured products prepared from epoxy compounds having a high epoxy functionality, that is, having a multiplicity of epoxy linkages within a single molecule, in general exhibit superior properties of strength and resistance to distortion by heat. Alternatively, there is a need for substances possessing low epoxy functionality to serve as reactive diluents.

It is therefore a principal object of this invention to provide a novel class of epoxy compounds wherein the epoxy functionality may be varied to meet the requirements of resins produced therefrom. An additional object is the provision of novel halohydrins from which such epoxy compounds may be produced. A more specific object is to provide a novel class of heterocyclic materials containing epoxy substituents, or halohydrin substituents which may serve as epoxy precursors.

These objects are accomplished by the provision of the products obtained from the reaction of a dodecahydro-1,4,7,9b-tetraazaphenalene with an epoxyhaloalkane followed by subsequent synthetic operations when required. The saturated 1,4,7,9b-tetraazaphenalenes employed as reactants are represented by the basic ring structure:

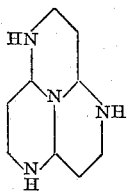

Such materials are prepared by condensation of ammonia with an α,β-monounsaturated aldehyde. By α,β-unsaturated aldehyde is meant that alkenal represented by the formula

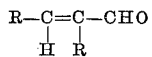

Wherein R is hydrogen, alkyl or aryl, and is unsubstituted or substituted with non-hydrocarbyl radicals. As the preferred dodecahydro-1,4,7,9b-tetraazaphenalenes of the invention contain only hydrogen or methyl substituents, α,β-monounsaturated aldehydes preferred for the production thereof contain only R groups that are hydrogen or methyl. The α,β-alkenals of 3 to 4 carbon atoms are preferred; they are acrolein, crotonaldehyde and methacrolein.

These aldehydes are condensed with ammonia to produce the desired intermediate dodecahydro-1,4,7,9b-tetraazaphenalene. The best method for effecting the condensation will vary, however, depending on the particular aldehyde. While crotonaldehyde reacts with aqueous ammonia to produce 2,5,8-trimethyldodecahydro-1,4,7,9b-tetraazaphenalene, a similar reaction procedure employing acrolein as a reactant customarily results in the production of polymer. However, acrolein reacts with ammonia in anhydrous alcoholic solution to produce dodecahydro-1,4,7,9b-tetraazaphenalene in good yield. In general, the preferred method for the production of the saturated tetraazaphenalene reactant comprises reacting the α,β-monounsaturated aldehyde with ammonia in anhydrous alcoholic solution at temperatures above about 80° C. and at super-atmospheric pressure. By alcohol is meant alkanols such as methanol, ethanol, propanol and the like; as well as polyhydric alcohols, such as ethylene glycol, trimethylene glycol and 1,2,6-hexanetriol; and ether-alcohols, e.g., the cellosolves and the carbitols. Other solvents including ketones, e.g., acetone and methyl ethyl ketone, and ethers, including tetrahydrofuran and dioxane, are suitable, although they are less preferred. The reaction is most advantageously carried out under anhydrous conditions, and in the presence of an excess of ammonia. Most effective concentration ratios are those from about 50 moles to about 200 moles of ammonia per mole of aldehyde. Temperatures between about 80° C. and about 200° C. are preferred, as are pressures from about 100 p.s.i.g. to about 5000 p.s.i.g.

Thus, the preferred saturated 1,4,7,9b-tetraazaphenalene reactants of the invention are those represented by the formula

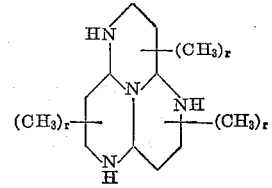

wherein each $r$ is a whole number from 0 to 2 inclusive, but preferably from 0 to 1. The $r$'s may have different values in a given substance by reacting a mixture of two or more of the aldehydes with ammonia. These saturated 1,4,7,9b-tetraazaphenalenes are white or light colored solids, characterized by sharp melting points. They are miscible with water and lower alkanols such as methanol and ethanol, but are only moderately soluble in chlorinated hydrocarbons, e.g., carbon tetrachloride. Exemplary compounds include dodecahydro-1,4,7,9b-tetraazaphenalene derived from acrolein; 2,5,8-trimethyldodecahydro-1,4,7,9b-tetraazaphenalene derived from crotonaldehyde; 3,6,9 - trimethyldodecahydro - 1,4,7,9b-tetraazaphenalene derived from methacrolein; and 2,3,5,6,8,9-hexamethyldodecahydro-1,4,7,9b-tetraazaphenalene derived from α-methylcrotonaldehyde. Also within the scope of saturated tetraazaphenalene reactants of the invention, although less preferred for reasons of difficulty of preparation, are those saturated 1,4,7,9b-tetraazaphenalenes prepared by reaction of ammonia with a mixture of aldehydes and therefore containing moieties of more than one alkenal, for example, 2,5,9-trimethyldodecahydro-1,4,7,9b-tetraazaphenalene prepared by reaction of crotonaldehyde and methacrolein, in a 2:1 ratio, with ammonia, and 2 - methyldodecahydro - 1,4,7,9b - tetraazaphenalene from the condensation of 2 molecules of acrolein and 1 molecule of crotonaldehyde with 4 molecules of ammonia. Most preferred for the properties of the products obtained therefrom, is the acrolein-ammonia adduct, dodecahydro-1,4,7,9b-tetraazaphenalene.

The saturated tetraazaphenalene is reacted with an epoxyhaloalkane. The epoxyhaloalkane reactants are the m,n-epoxy-o-haloalkanes wherein m, n and o represent consecutively numbered carbon atoms in the alkane portion of the compound, that is, the adjacent epoxyhaloalkanes represented by the formula

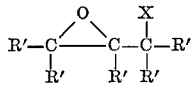

wherein R' is hydrogen, alkyl or aryl, and X represents halogen. Preferred epoxyhaloalkanes of the invention, however, are the epihalohydrins, that is, the epoxyhaloalkanes of the above-depicted formula wherein each R' is hydrogen. Although such epihalohydrins as epifluorohydrin and epiiodohydrin are useful, preferred epihalohydrins are those containing a middle halogen, that is a halogen having an atomic number of from 17 to 35, that is, epichlorohydrin and epibromohydrin.

The saturated 1,4,7,9b-tetraazaphenalene and epoxyhaloalkane are reacted in liquid phase solution. While suitable solvents for this process include ketones, such as acetone and methyl isobutyl ketone; esters such as ethyl acetate and methyl propionate; and ethers including dioxane and tetrahydrofuran, the preferred class of solvents comprises the alcohols, including monohydric alcohols such as methanol, ethanol, isopropanol and tert-butanol; polyhydric alcohols such as ethylene glycol and 1,2,6-hexanetriol; and ether-alcohols, e.g., mono-lower alkyl ethers of ethylene glycol and diethylene glycol wherein the alkyl group contains from 1 to 4 carbon atoms.

The reaction may be conducted within a wide range of temperatures. In general, temperatures from about —20° C. to about 100° C. are satisfactory, while temperatures from about 0° C. to about 50° C. are to be preferred.

There are three sites of the dodecahydro-1,4,7,9b-tetraazaphenalene structure available for reaction with epoxyhaloalkanes. They are the active hydrogen atoms connected to the three peripheral nitrogen atoms of the basic ring structure. By varying the reaction conditions, particularly the ratio of reactants, it is possible to control the degree of reaction, thereby controlling the number of peripheral-N-substituents introduced. The saturated 1,4,7,9b-tetraazaphenalene and epoxyhaloalkane are customarily mixed in essentially stoichiometric amounts, that is, one mole of epoxyhaloalkane per mole of saturated tetraazaphenalene for each substituent to be introduced, although an excess of epoxyhaloalkane is not detrimental when a high degree of condensation is desired, and a low degree of condensation is favored by an excess of the saturated tetraazaphenalene. However, essentially stoichiometric amounts of reactants are preferred. Thus, when three moles of epoxyhaloalkane are reacted with one mole of tetraazaphenalene, reaction generally occurs with each active hydrogen, thereby introducing three substituents upon the dodecahydro-1,4,7,9b-tetraazaphenalene ring system. Alternatively, when lesser amounts of epoxyhaloalkane are employed, lesser degrees of condensation are obtained, and thus mono- and bis- as well as the tris- derivatives are obtainable.

Although the condensation reaction may be effected by adding either reactant to the other, it is equivalently useful to initially mix the total amount of reactants. The reaction mixture is then maintained at the desired reaction temperature, generally with stirring, until reaction is completed. The products are obtained, subsequent to solvent removal, by conventional methods such as fractional crystallization and selective extraction.

The novel products produced by the reaction of preferred dodecahydro-1,4,7,9b-tetraazaphenalenes and preferred epoxyhaloalkanes are represented by the formula

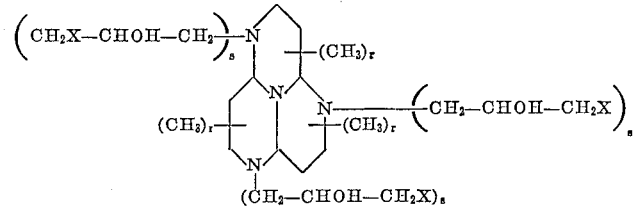

wherein $r$ and X have the previously stated significance, and each $s$ is a whole number from 0 to 1 inclusive. Illustrative products include:

N-(3-chloro-2-hydroxypropyl)-dodecahydro-1,4,7,9b-tetraazaphenalene;
N,N'-bis(3-chloro-2-hydroxypropyl)-dodecahydro-1,4,7,9b-tetraazaphenalene;
N,N'-bis(3-bromo-2-hydroxypropyl)-dodecahydro-1,4,7,9b-tetraazaphenalene;
N,N',N''-tris(3-chloro-2-hydroxypropyl)-dodecahydro-1,4,7,9b-tetraazaphenalene;
N,N',N''-tris(3-iodo-2-hydroxypropyl)-2,5,8-trimethyl-dodecahydro-1,4,7,9b-tetraazaphenalene;
N,N'-bis(3-chloro-2-hydroxypropyl)-2,5,8-trimethyldodecahydro-1,4,7,9b-tetraazaphenalene;
N,N'-bis(3-fluoro-2-hydroxypropyl)-dodecahydro-1,4,7,9b-tetraazaphenalene;
N,N',N''-tris(3-bromo-2-hydroxypropyl)-2,5,8-trimethyl-dodecahydro-1,4,7,9b-tetraazaphenalene;
N-(3-chloro-2-hydroxypropyl)-3,6,9-trimethyldodecahydro-1,4,7,9b-tetraazaphenalene;
N,N',N''-tris(3-chloro-2-hydroxypropyl)-3,6,9-trimethyldodecahydro-1,4,7,9b-tetraazaphenalene; and
N,N',N''-tris(3-bromo-2-hydroxypropyl)-2,6,9-trimethyldodecahydro-1,4,7,9b-tetraazaphenalene.

The novel epoxyalkyl-substituted dodecahydro-1,4,7,9b-tetraazaphenalenes of the invention are obtained by dehydrohalogenating the corresponding halohydrin derivatives. The dehydrohalogenation is carried out by treatment of the halohydrin with base, preferably in the presence of a solvent. The preferred method for effecting the dehydrohalogenation comprises heating the halohydrin derivative in solution in the presence of base, which may be utilized either as a constituent of the reaction solution, or in the form of a finely divided solid suspended in the reaction medium. Preferred bases comprise the alkali metal and alkaline earth hydroxides, e.g., sodium hydroxide, potassium hydroxide, cesium hydroxide, barium hydroxide and calcium hydroxide, as well as the corresponding oxides. Other suitable bases include the alkali metal alkoxides, particularly those alkoxides prepared from tertiary alcohols, e.g., sodium tert-butoxide, potassium tert-butoxide, and the sodium salt of diethylmethylcarbinol. Solvents that are suitable for the dehydrohalogenation process are those solvents in which the saturated 1,4,7,9b-tetraazaphenalene is soluble, which are liquid at reaction temperature, which are essentially inert towards the epoxide ring to be formed, and which do not react with other solvent molecules under the alkaline conditions of the reaction. Such solvents include ketones, e.g., methyl ethyl ketone, methyl isobutyl ketone, dipropyl ketone and cyclohexanone; hydrocarbons such as benzene, toluene, xylene, hexane, isooctane, cyclohexane and decalin; esters including ethyl acetate, ethyl propionate, and propyl butyrate; ethers such as dioxane, tetrahydrofuran, diethyl ether, propyl hexyl ether and lower alkyl ethers of ethylene glycol, glycerine and di- and tetra-ethylene glycol; tertiary alcohols such as tert-butyl alcohol and tert-amyl alcohol, and halogenated hydrocarbons such as methylene chloride.

The temperature of the dehydrohalogenation reaction generally ranges from room temperature, i.e., 20–30° C., to about 100° C., although higher or lower temperatures may be employed. Temperatures from about 40° C. to about 80° C. are preferred.

The individual epoxyalkyl-substituted dodecahydro-1,4,7,9b-tetraazaphenalenes are low-melting solids. The products may be recovered by conventional means as by vacuum distillation subsequent to solvent removal. The products of the dehydrohalogenation process are represented by the formula

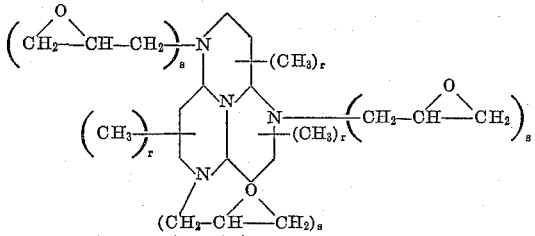

wherein $r$ and $s$ have the previously stated significance. Illustrative of such compounds are N,N'-bis(2,3-epoxypropyl)-dodecahydro-1,4,7,9b-tetraazaphenalene;

N,N',N''-tris(2,3-epoxypropyl)-dodecahydro-1,4,7,9b-tetraazaphenalene;

N,N'-bis(2,3-epoxypropyl)-2,5,8-trimethyldodecahydro-1,4,7,9b-tetraazaphenalene;

N,N',N''-tris(2,3-epoxypropyl)-2,5,8-trimethyldodecahydro-1,4,7,9b-tetraazaphenalene;

N-(2,3-epoxypropyl)-2,5,8-trimethyldodecahydro-1,4,7,9b-tetraazaphenalene;

N,N'-bis(2,3-epoxypropyl)-3,6,9-trimethyldodecahydro-1,4,7,9b-tetraazaphenalene;

N,N',N''-tris(2,3-epoxypropyl)-3,6,9-trimethyldodecahydro-1,4,7,9b-tetraazaphenalene;

N,N',N''-tris(2,3-epoxypropyl)-2,5,9-trimethyldodecahydro-1,4,7,9b-tetraazaphenalenes; and N,N',N''-tris(2,3-epoxypropyl)-3-methyldodecahydro-1,4,7,9b-tetraazaphenalene.

The novel 3-halo-2-hydroxypropyl derivatives of the saturated tetraazaphenalenes find utility as chemical intermediates. One such application, of course, involves the dehydrohalogenation of the halohydrin to the corresponding novel 2,3-epoxypropyl derivatives of the invention. Alternatively however, the 3-halo-2-hydroxypropyl derivatives may be reacted with tertiary amines to form quaternary ammonium salts, or with sodium hydrosulfide to form the corresponding hydroxy mercaptans. Reaction of the halohydrin with alkylene oxides, e.g., ethylene oxide and propylene oxide, produces polyoxyalkylene compounds which are useful in the production of polyurethane foams. In addition, reaction of the halohydrin derivatives with salts of carboxylic acids in the presence of base leads to the formation of esters, while ethers are produced by reaction of the halohydrins with alcoholates or phenates.

The epoxy materials of the invention are useful materials from which superior epoxy resins may be produced. Resins prepared from polyepoxyalkyl derivatives in particular offer a closely knit, polyfunctional epoxy character that imparts to the resins produced therefrom qualities of strength and resistance to the detrimental effects of heat.

Through the use of a variety of curing agents, the epoxy compounds may be polymerized, but alternatively, the epoxy compounds may be mixed with other epoxy compounds such as glycidyl esters and glycidyl ethers and the like, and then cured to form copolymeric products.

Suitable curing agents include those having active hydrogens, such as the polyamines, e.g., trimethylenediamine and phenylenediamine, and polycarboxylic acids including oxalic and phthalic acids. Other suitable curing agents include tertiary amines such as triethylamine and benzyldimethylamine; polycarboxylic acid anhydrides such as dodecenylsuccinic anhydride and hexahydrophthalic anhydride, as well as metal salts illustrated by the zinc, copper and potassium salts of fluoboric, sulfuric and phosphoric acids.

The epoxy compounds are cured by mixing with the curing agent. Although the cure will take place at room temperature, the cure is accelerated by the application of heat, such as at temperatures from about 50° C. to about 200° C. The cured products thus obtained are hard, infusible materials that are useful in adhesives, laminates and castings.

The novel epoxy derivatives of the present invention find further utility as chemical intermediates. Reaction of the epoxy linkage with alcohols results in the formation of hydroxy ethers, while hydroxy esters are produced by the reaction of the epoxide linkage with acids, lactones and sultones. Alternatively, the epoxide group may be hydrolyzed with water to form the diol, or reacted with hydrogen sulfide to form the hydroxy mercaptan.

To illustrate the production of the novel compounds of the invention, the following examples are provided. It should be understood that they are not to be regarded as limitations, as the teachings thereof may be varied as will be understood by one skilled in this art.

*Example I*

A solution of 9.1 g. (0.05 mole) of dodecahydro-1,4,7,9b-tetraazaphenalene and 14 g. (0.15 mole) of epichlorohydrin in 50 ml. of methanol was stirred at 30° C. for 18 hours. Volume reduction on a rotary evaporator at 40° C. and low pressure afforded 18 g. of pale yellow solid. The product was titurated with chloroform and filtered to remove insoluble material. The chloroform solvent was evaporated at reduced pressure to give a 70% yield of N,N',N''-tris(3-chloro-2-hydroxypropyl)-dodecahydro-1,4,7,9b-tetraazaphenalene.

|  | Anal. Found | Calc. |
|---|---|---|
| Percent C | 45.9 | 46.9 |
| Percent H | 7.09 | 7.19 |
| Percent N | 12.0 | 12.2 |
| Percent Cl | 23.4 | 23.2 |
| Chlorohydrin, eq./100 g | 0.65 | 0.65 |

*Example II*

A procedure similar to that of Example I was employed to react 2,5,8-trimethyldodecahydro-1,4,7,9b-tetraazaphenalene with epichlorohydrin, except that the reaction mixture was stirred for 60 hours at 25–30° C. A pale yellow solid was obtained that analysis indicated was N,N'-bis(3-chloro-2-hydroxypropyl)-2,5,8-trimethyl-dodecahydro-1,4,7,9b-tetraazaphenalene.

|  | Anal. Found | Calc. |
|---|---|---|
| Percent C | 54.0 | 53.1 |
| Percent H | 8.7 | 8.3 |
| Percent N | 13.5 | 13.6 |
| Percent Cl | 17.0 | 17.3 |
| Percent ionic chloride | 0.031 | 0.00 |
| Chlorohydrin, eq./100 g | 0.44 | 0.48 |

*Example III*

The procedure of Example II was repeated, except that the reaction mixture was stirred for 30 hours at 50° C. A 75% yield of solid, somewhat dark in color, was obtained. Analysis indicated this product was N,N',N''-tris(3-chloro-2-hydroxypropyl)-2,5,8-trimethyldodecahydro-1,4,7,9b-tetraazaphenalene.

|  | Anal. Found | Calc. |
|---|---|---|
| Percent C | 48.7 | 50.2 |
| Percent H | 7.6 | 7.8 |
| Percent N | 10.4 | 11.2 |
| Percent Cl | 22.7 | 21.4 |
| Percent ionic chloride | 0.103 | 0.0 |

Example IV

When the procedure of Example I is followed, except that epichlorohydrin and dodecahydro-1,4,7,9b-tetraazaphenalene are reacted in a ratio of 2:1, good yields of N,N'-bis(3-chloro-2-hydroxypropyl) - dodecahydro-1,4,7,9b-tetraazaphenalene are obtained.

Example V

Following the procedure of Example III, good yields of N,N',N''-tris(3 - bromo - 2 - hydroxypropyl)-3,6,9-trimethyldodecahydro - 1,4,7,9b - tetraazaphenalene are obtained from reaction of epibromohydrin and 3,6,9-trimethyldodecahydro-1,4,7,9b-tetraazaphenalene.

Example VI

When 2,5,8-trimethyldodecahydro - 1,4,7,9b - tetraazaphenalene and epichlorohydrin are reacted in a 1:1 ratio by the procedure of Example II, good yields of N-(3-chloro - 2 - hydroxypropyl)-2,5,8-trimethyldodecahydro-1,4,7,9b-tetraazaphenalene are obtained.

Example VII

A solution 7.4 g. of N,N',N''-tris(3-chloro-2-hydroxypropyl)-dodecahydro-1,4,7,9b-tetrazaaphenalene in 60 ml. of methyl ethyl ketone was stirred for two hours at 50° C. with 3 g. of powdered sodium hydroxide. The mixture was filtered and the filtrate neutralized with Dry Ice. After drying, volume reduction on a rotary evaporator at 40° C. and low pressure gave 5 g. of a pale yellow syrup which was soluble in most organic solvents. Analysis indicated the product contained N,N',N''-tris(2,3 - epoxypropyl) - dodecahydro - 1,4,7,9b-tetraazaphenalene.

*Analysis.*—Calc. for $C_{18}H_{30}N_4O_3$: Epoxide value, 0.84 eq./100 g. Found: 0.45 eq./100 g.

Example VIII

When N,N',N''-tris(3-chloro-2-hydroxypropyl)-2,5,8-trimethyldodecahydro-1,4,7,9b-tetraazaphenalene is heated in methyl isobutyl ketone solution with powdered potassium hydroxide, good yields of N,N',N''-tris(2,3-epoxypropyl) - 2,5,8 - trimethyldodecahydro-1,4,7,9b-tetraazaphenalene are obtained.

Similar results are obtained when N,N'-bis(3-chloro-2-hydroxypropyl) - 2,5,8 - trimethyldodecahydro - 1,4,7,9b-tetraazaphenalene is dehydrohalogenated in tert-butyl alcohol solution with powdered sodium hydroxide.

Example IX

Following the procedure of Example VII, N-(3-bromo-2-hydroxypropyl) - 3,6,9 - trimethyldodecahydro-1,4,7,9b-tetraazaphenalene is reacted in benzene solution with powdered sodium hydroxide to produce good yields of N-(2,3 - epoxypropyl) - 3,6,9 - trimethyldodecahydro-1,4,7,9b-tetraazaphenalene.

I claim as my invention:

1. Mono- to tris- peripheral-N-substituted dodecahydro-1,4,7,9b-tetraazaphenalene, wherein said nitrogen-substituents are 3-halo-2-hydroxypropyl.

2. Mono- to tris- peripheral-N-substituted dodecahydro - 1,4,7,9b - tetraazaphenalenes, wherein said nitrogen-substituents are 3-halo-2-hydroxypropyl and containing as any additional substituents, only from 1 to 6 methyls in substitution for hydrogen on ring carbons numbered 2,3,5,6,8 and 9.

3. The compound N,N',N'' - tris(3-chloro-2-hydroxypropyl)-dodecahydro-1,4,7,9b-tetraazaphenalene.

4. The compound N,N',-N''-bis(3-chloro-2-hydroxypropyl) - 2,5,8 - trimethyldodecahydro-1,4,7,9b-tetraazaphenalene.

5. The compound N,N'-bis(3 - chloro-2-hydroxypropyl)-dodecahydro-1,4,7,9b-tetraazaphenalene.

6. The compound N,N'-bis(3 - chloro-2-hydroxypropyl) - 2,5,8 - trimethyldodecahydro-1,4,7,9b-tetraazaphenalene.

7. The compound N,N'-bis(3 - bromo-2-hydroxypropyl) - 2,5,8 - trimethyldodecahydro-1,4,7,9b-tetraazaphenalene.

8. The compound N,N'-bis(3 - chloro-2-hydroxypropyl) - 3,6,9 - trimethyldodecahydro-1,4,7,9b-tetraazaphenalene.

9. The compound N-(3-chloro-2-hydroxypropyl)-2,5,8-trimethyldodecahydro-1,4,7,9b-tetraazaphenalene.

10. The compound N,N',N''-tris(2,3-epoxypropyl)-dodecahydro-1,4,7,9b-tetraazaphenalene.

11. The compound N,N'-bis(2,3-epoxypropyl)-dodecahydro-1,4,7,9b-tetraazaphenalene.

12. The compound N,N',N''-tris(2,3 - epoxypropyl)-2,5,8-trimethyldodecahydro-1,4,7,9b-tetraazaphenalene.

13. The compound N,N'-bis(2,3-epoxypropyl)-2,5,8-trimethyldodecahydro-1,4,7,9b-tetraazaphenalene.

14. The compound N-(2,3-epoxypropyl)-2,5,8-trimethyldodecahydro-1,4,7,9b-tetraazaphenalene.

15. The compound N,N'-bis(2,3-epoxypropyl)-3,6,9-trimethyldodecahydro-1,4,7,9b-tetraazaphenalene.

16. Mono- to tris- peripheral-N-substituted dodecahydro-1,4,7,9b-tetraazaphenalene, wherein said nitrogen-substituents are 2,3-epoxypropyl.

17. Mono- to tris- peripheral-N-substituted dodecahydro - 1,4,7,9b - tetraazaphenalenes, wherein said nitrogen-substituents are 2,3-epoxypropyl and containing as any additional substituents, only from 1 to 6 methyls in substitution for hydrogen on ring carbons numbered 2,3,5,6,8 and 9.

No references cited.